Sept. 24, 1940.  A. L. KRONQUEST ET AL  2,216,082
ROLLER MOUNTING FOR CAN HEAD SEAMING APPARATUS
Filed May 6, 1938
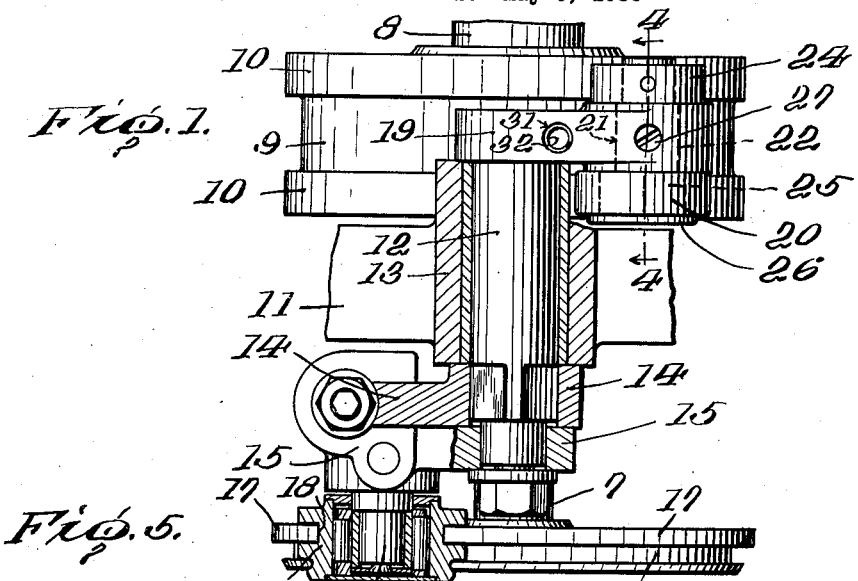
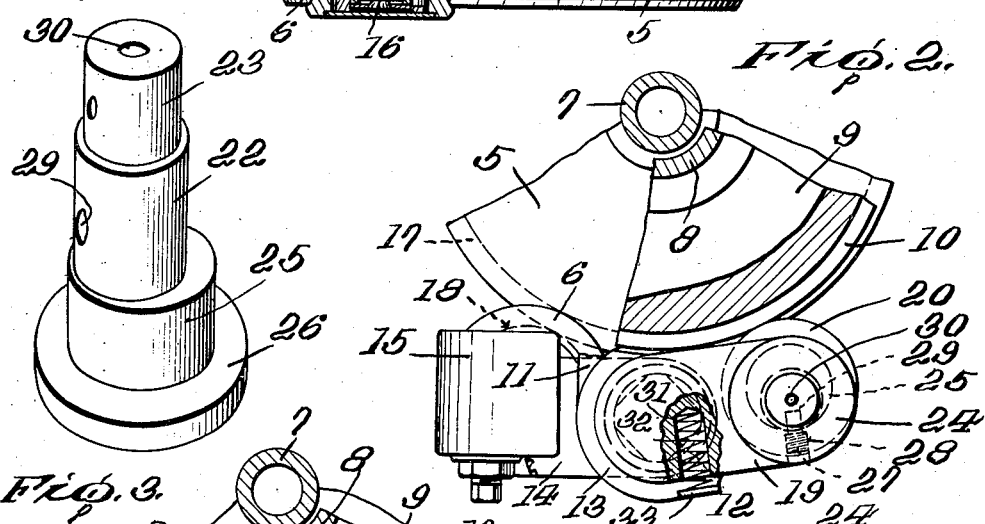
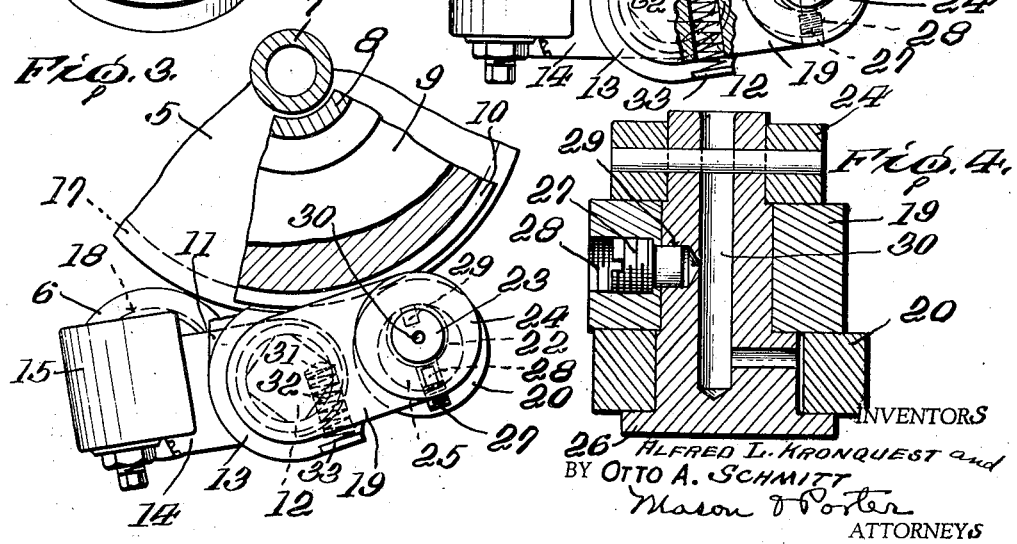
INVENTORS
ALFRED L. KRONQUEST and
BY OTTO A. SCHMITT
Mason & Porter
ATTORNEYS Patented Sept. 24, 1940

2,216,082

UNITED STATES PATENT OFFICE 2,216,082

ROLLER MOUNTING FOR CAN HEAD SEAMING APPARATUS

Alfred L. Kronquest and Otto A. Schmitt, Syracuse, N. Y., assignors to Continental Can Company, Inc., New York, N. Y., a corporation of New York Application May 6, 1938, Serial No. 206,452

8 Claims. (Cl. 113—19)

The invention relates generally to can head seaming apparatus and primarily seeks to provide a novel roller mounting adapted to facilitate removal and replacement of the can head seaming rollers employed in such apparatus.

In the art of seam-securing heads or end closures on cans, a head is applied loosely to the open and outwardly flanged end of each can and then engaged with a chuck including a head portion shaped to fit within and against the heel portion of the can head, after which the suitably shaped seaming roller equipment is brought into engagement with the edge of the head to roll the securing seam about the can flange and against the chuck. The seaming operation is effected by rotating the seaming rollers about the chuck and can, or by rotating the chuck and can relative to the seaming rollers, and in each instance the seaming rollers, carried on crank arms bearing actuator rollers, are moved against the can head and chuck by reciprocatory or rotary cam devices engageable with the actuator rollers. An example of head seaming apparatus embodying a reciprocatory cam device is to be found in the U. S. patent to Jackson, 1,731,136 of October 8, 1929, and an example of apparatus employing a seaming roller controlling cam of the rotary type is to be found in the U. S. patent to Kronquest, 2,025,061, of December 24, 1935.

Head seaming roller and chuck elements of the character stated commonly are retained in cooperative relation by interengaging flange and groove equipments, and usually means are provided for effecting an adjustment of the angle of projection of the seaming roller supporting crank arms so as to adapt the apparatus to use in seaming heads on cans of varied diameters. It is also desirable at times to remove and replace the seaming rollers, but heretofore these rollers have been so mounted that they could not be removed and replaced without considerable difficulty, or without disturbing the adjustment of the crank arms relative to the actuator cam devices.

Therefore, in its more detailed nature, the invention resides in the provision of novel mountings for the seaming rollers in which the interengaging flange and groove equipments of the rollers and the chuck constitute the sole means for securing the rollers against removal from their supporting crank arms, and in which are provided novel mounting pins for the actuator rollers including eccentric portions adjustable between normal mounting positions in which the interengagement of the flange and groove equipments is secured and an abnormal position in which the flange and groove equipments are disengageable to enable free removal and replacement of the seaming rollers.

Another object of the invention is to provide means for so securing the actuator roller mounting pins as to enable adjustment of said pins for facilitating removal and replacement of the seaming rollers without danger of disturbing adjustments of the roller supporting crank arms relative to the actuator cam devices.

Another object of the invention is to provide novel spring means for holding the seaming rollers away from the chuck at all times other than during the actual seaming function.

With these and other objects in view which will more fully appear, the nature of the invention will be more clearly understood by following the description, the appended claims, and the several views illustrated in the accompanying drawing.

In the drawing:

Figure 1 is a fragmentary vertical cross section of a can head seaming apparatus embodying the invention, parts being in side elevation.

Figure 2 is a fragmentary plan view and part horizontal section of the parts shown in Figure 1, the seaming and actuator rollers being shown in the normal operative relation, parts being broken away and in section.

Figure 3 is a view similar to Figure 2, the actuator roller mounting pin being shown adjusted to a position enabling a freeing of the seaming roller from its normal flange and groove secured condition.

Figure 4 is a detail vertical cross section taken through the actuator roller and its mounting pin on the line 4—4 on Figure 1.

Figure 5 is a detail perspective view of the actuator roller mounting pin.

As an example of embodiment of the invention, I have chosen to illustrate the improved roller mounting in combination with a head seaming apparatus of the type which employs a rotary cam for actuating the seaming rollers. The construction and operation of such apparatus is well known and will be dealt with but briefly herein since a more adequate and complete disclosure of the heretofore known parts is to be found in Figures 15 to 17 and the supporting descriptive matter in the U. S. patent to Kronquest, 2,025,061 of December 24, 1935, hereinbefore referred to.

It is to be understood that the invention is applicable to a single seaming roller actuating equipment or to the usual equipments embodying the well known first and second operation rollers. In the Kronquest patent referred to two first operation rollers and two second operation rollers are disclosed.

In the drawing 5 designates the chuck, and 6 one of the seaming rollers, it being understood that the can head is seam-secured in place on the can by engagement of the rollers with the seam, said rollers acting against the chuck as an opposing abutment, and the chuck and rollers being relatively rotated in the well known manner. The chuck is carried by a sleeve 7 which is surrounded by a sleeve 8 on which is mounted the rotary actuator cam element 9 having actuator roller engaging cam rim portions 10.

The seaming head generally designated 11 carries the seaming roller equipments, one only of which is shown and described herein. This equipment comprises a short vertical shaft 12 rockably supported in the head bearing 13 and carrying at its lower end an arm 14 which is fixed to the shaft and an arm 15 which may be adjusted with relation to said shaft to vary the angle of projection of the seaming roller and adapt it for engagement with cans of varied diameters. The arm 15 carries a depending seaming roller receiving stud 16, and the seaming roller 6 can be readily slipped on or off the stud whenever the carrying crank equipment is swung out far enough to disengage the chuck flange 17 from the seaming roller groove 18, said flange and groove equipment constituting the sole means for securing the roller upon the stud. See Figure 3.

At the upper end of the shaft 12 there is an actuator arm 19, and on the free end of this arm is carried an actuator roller 20 which is engaged by one of the cam rims 10 for imparting rocking movement to the shaft 12. I employ novel means for adjustably mounting the actuator roller 20 at the free end of the actuator arm 19 and will now proceed to describe this means.

It will be obvious that the vertical shaft 12, the upper or actuator arm 19, and the lower composite arm 14, 15 together comprise a rockably mounted crank structure.

The actuator lever is equipped with a vertical bore 21 at its free end and in this bore the main body portion 22 of a mounting pin is receivable. A concentric reduced portion 23 of the pin extends above the lever and has a securing collar 24 affixed thereon, and an eccentrically disposed shank 25 and retainer head 26 extend below the lever and serve to adjustably support the actuator roller 20. The mounting pin is shown in detail in Figure 5.

Preferably, the mounting pin is secured in definite position in the arm 19, with the maximum of eccentricity of the roller mounting shank portion 25 thereof directed toward the adjacent cam rim 10, by a securing screw 27 operable in a threaded socket 28 in the arm 19 and engageable in a receiving recess 29 located at a definite point in the main body portion 22 of the pin as shown in Figures 2, 3 and 4 of the drawing.

With this equipment it is a simple matter to withdraw the screw 27 from the receiving recess 29 in the mounting pin portion 22 and then rotate the pin about the axis of said portion to move the roller 20 away from the cam rim 10 a sufficient distance to enable a rocking of the shaft 12 in degree sufficient to free the seaming roller 6 from engagement with the chuck flange 17 and permit removal of the seaming roller from the stud 16. See Figure 3. Because of the provision of the recess 29 at one point only, this adjustment of parts can be made, and then the normal condition of the parts shown in Figure 2 restored, without any danger of disturbing the adjustment of the relatively movable crank arm parts 14 and 15. By this means it is possible to remove and replace seaming rollers without the necessity of readjusting the carrying crank arms and the seaming up of sample cans. An oil duct 30 may be provided in the mounting pin as shown in Figures 4 and 5.

While centrifugal force can be relied upon, in some installations and conditions of use, to hold the seaming rollers away from the chuck except during actual seaming functions, it is preferable that spring means be employed for this purpose. For this purpose, each arm 19 may be provided with a socket 31 for receiving a compression spring 32 which projects from the socket into engagement with an abutment member 33 carried by the head bearing portion 13 as shown in Figures 2 and 3 of the drawing.

What we claim is:

1. In can head seaming apparatus, the combination of a chuck having an annular flange, a seaming roller having a groove for normally receiving said flange, a rockably mounted crank structure, a stud carried by the crank structure and supporting said seaming roller, an actuator roller carried by said crank structure, actuator cam means engageable with said actuator roller for imparting movement to the crank structure and the seaming roller, said flange and groove equipment serving normally as the sole means for retaining the seaming roller on the stud, and a mounting pin for mounting the actuator roller adjustably about its axis on said crank structure and including an eccentric shank portion on which said actuator roller is mounted whereby adjustment of said pin will alter position of said actuator roller and crank structure relative to said cam means and free the flange and groove equipments to enable removal of the seaming roller from the stud.

2. In can head seaming apparatus, the combination of a chuck having an annular flange, a seaming roller having a groove for normlly receiving said flange, a rockably mounted crank structure, a stud carried by the crank structure and supporting said seaming roller, an actuator roller carried by said crank structure, actuator cam means engageable with said actuator roller for imparting movement to the crank structure and the seaming roller, said flange and groove equipment serving normally as the sole means for retaining the seaming roller on the stud, a mounting pin for mounting the roller adjustably about its axis on said crank structure and including an eccentric shank portion on which said actuator is mounted whereby adjustment of said pin will alter position of said actuator roller and crank structure relative to said cam means and free the flange and groove equipments to enable removal of the seaming roller from the stud, and means effective at one position only of said pin for securing the pin against movement about its axis.

3. In can head seaming apparatus, the combination of a chuck having an annular flange, a seaming roller having a groove for normally receiving said flange, a rockably mounted crank structure, a stud carried by the crank structure and supporting said seaming roller, an actuator roller carried by said crank structure, actuator cam means engageable with said actuator roller for imparting movement to the crank structure and the seaming roller, said flange and groove equipment serving normally as the sole means for retaining the seaming roller on the stud, a mounting pin for mounting the roller adjustably about its axis on said crank structure and including an eccentric shank portion on which said actuator is mounted whereby adjustment of said pin will alter position of said actuator roller and crank structure relative to said cam means and free the flange and groove equipments to enable removal of the seaming roller from the stud, a receiving recess formed at a definite point in said pin, and a screw member mounted on said crank structure and engageable in and removable from said recess.

4. A seaming head for can closing machines comprising a rotatable head portion, a rotatable cam and a chuck associated with the head portion and having an annular flange, a vertically disposed spindle carried by the head portion, a supporting arm connected to the lower end of the spindle and including a roller receiving stud, a seaming roller carried by said supporting arm stud and having an annular groove for normally receiving said chuck flange whereby said flange constitutes the sole means for maintaining the roller on the stud, an actuator arm connected to the upper end of said spindle and having a bore at the free end thereof, a mounting pin rotatable in said actuator arm bore, an eccentric shank portion carried by said pin, an actuator roller mounted on the eccentric shank portion of the pin and adapted to engage said rotatable cam, and means for releasably holding said pin in a set position in said actuator arm bore whereby upon release of said holding means and partial rotation of said pin the actuator roller may be shifted so as to permit the seaming roller to be disengaged from the chuck flange for removal from the stud supporting the same.

5. In can head seaming apparatus, the combination of a chuck having an annular flange, a seaming roller having a groove for normally receiving said flange, a rockably mounted crank structure, a stud carried by the crank structure and supporting said seaming roller, an actuator roller carried by said crank structure, actuator cam means engageable with said actuator roller for imparting movement to the crank structure and the seaming roller, said flange and groove equipment serving normally as the sole means for retaining the seaming roller on the stud, yieldable means constantly urging said actuator roller against said cam means, and a mounting pin for mounting the actuator roller adjustably about its axis on said crank structure and including an eccentric shank portion on which said actuator roller is mounted whereby adjustment of said pin will alter position of said actuator roller and crank structure relative to said cam means and free the flange and groove equipments to enable removal of the seaming roller from the stud.

6. A seaming head for can closing machines comprising a rotatable head portion, a rotatable cam and a chuck associated with the head portion and having an annular flange, a vertically disposed spindle carried by the head portion, a supporting arm connected to the lower end of the spindle and including a roller receiving stud, a seaming roller carried by said supporting arm stud and having an annular groove for normally receiving said chuck flange whereby said flange constitutes the sole means for maintaining the roller on the stud, an actuator arm connected to the upper end of said spindle and having a bore at the free end thereof, a mounting pin rotatable in said actuator arm bore, an eccentric shank portion carried by said pin, an actuator roller mounted on the eccentric shank portion of said pin and adapted to engage said rotatable cam, spring means constantly urging said actuator arm in a direction for holding the actuator roller against said rotatable cam, and means for releasably holding said pin in a set position in said actuator arm bore whereby upon release of said holding means and partial rotation of said pin the actuator roller may be shifted so as to permit the seaming roller to be disengaged from the chuck flange for removal from the stud supporting the same.

7. In can head seaming apparatus, a rock shaft, an actuator arm projecting from said shaft, a supporting arm projecting from said shaft, said shaft and arms together comprising a rockably mounted crank structure movable between operative and inoperative positions, one said arm including means for varying its effective angularity with respect to the other arm, a mounting stud on said supporting arm, a seaming roller freely placed on said stud, means effective only in an operative position of the supporting arm for holding the roller on said stud, an actuator roller mounted on said actuator arm, a mounting pin for mounting said actuator roller adjustable about its axis on said actuator arm and including an eccentric shank portion on which said actuator roller is mounted and effective upon adjustment of the mounting pin about its axis to alter the relation of the actuator roller axis with respect to the axes of said shaft and stud to move the supporting arm between its operative and inoperative positions without disturbing the adjustment of relative angularity of said arms, and means effective at one position only of said mounting pin for securing the pin against movement about its axis.

8. In can head seaming apparatus, a rock shaft, an actuator arm projecting from said shaft, a supporting arm projecting from said shaft, said shaft and arms together comprising a rockably mounted crank structure movable between operative and inoperative positions, one said arm including means for varying its effective angularity with respect to the other arm, a mounting stud on said supporting arm, a seaming roller freely placed on said stud, means effective only in the operative position of the supporting arm for holding the roller on said stud, an actuator roller mounted on said actuator arm, a mounting pin for mounting said actuator roller adjustable about its axis on said actuator arm and including an eccentric shank portion on which said actuator roller is mounted and effective upon adjustment of the mounting pin about its axis to alter the relation of the actuator roller axis with respect to the axes of said shaft and stud to move the supporting arm between its operative and inoperative positions without disturbing the adjustment of relative angularity of said arms, a receiving recess formed at a definite point in said mounting pin, and a screw member mounted on said arm and engageable in and removable from said recess.

ALFRED L. KRONQUEST.
OTTO A. SCHMITT.